March 17, 1942.    L. A. MAJNERI    2,276,853
FLUID PRESSURE CONTROL DEVICE
Filed Dec. 23, 1940    2 Sheets-Sheet 1
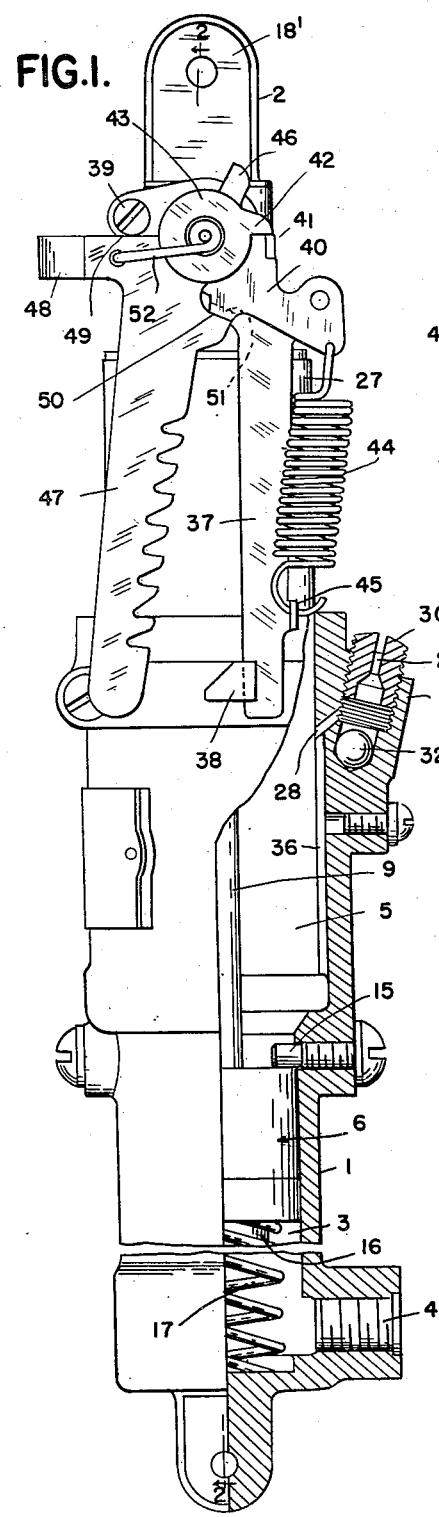
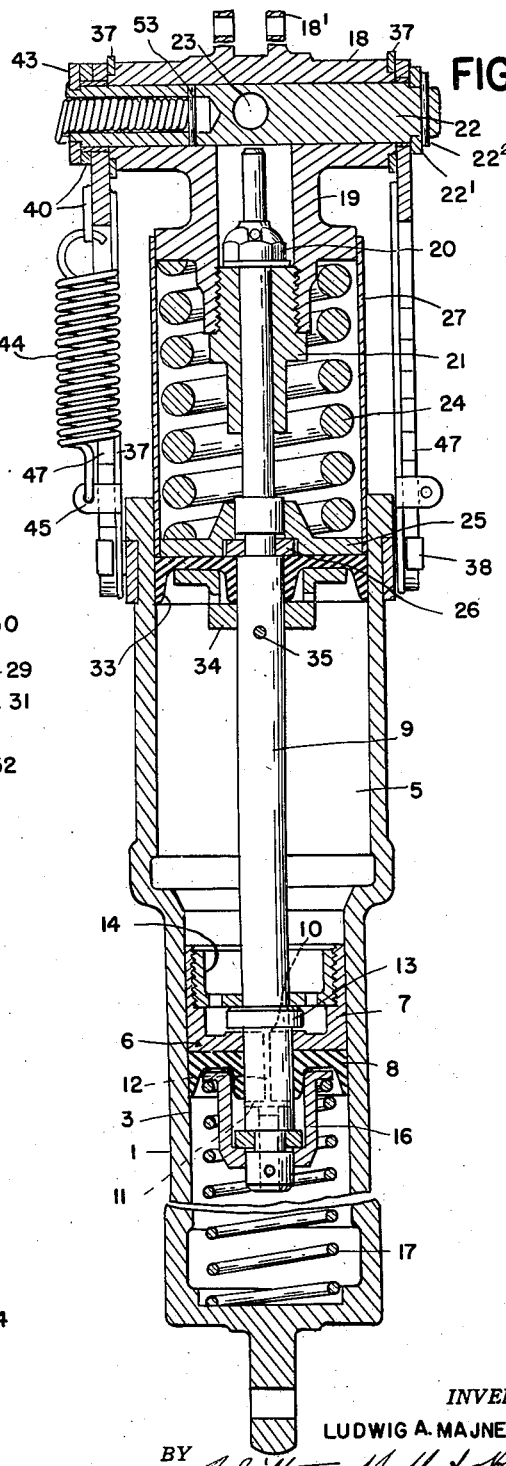
INVENTOR.
LUDWIG A. MAJNERI
BY
ATTORNEYS March 17, 1942. L. A. MAJNERI 2,276,853
FLUID PRESSURE CONTROL DEVICE
Filed Dec. 23, 1940 2 Sheets-Sheet 2
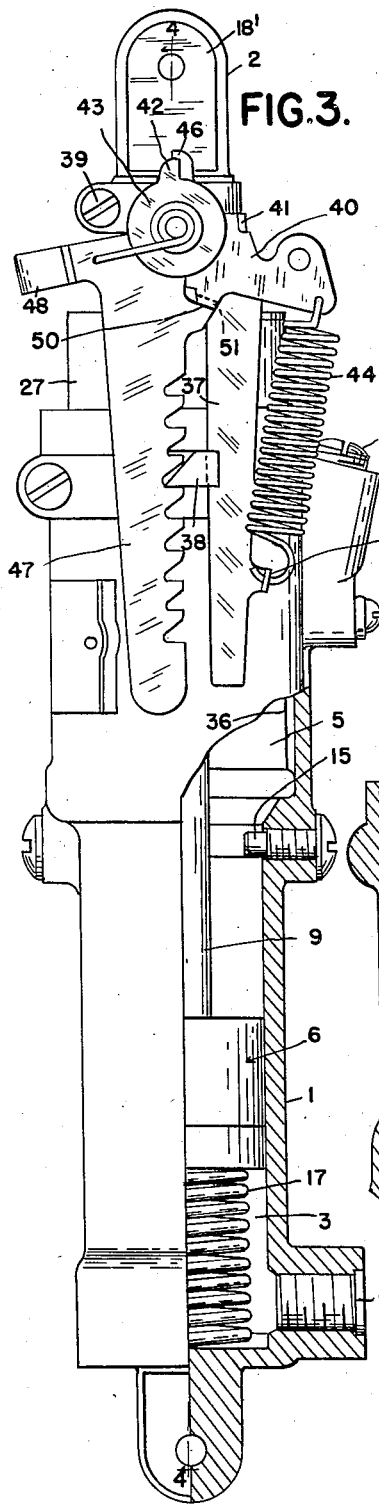
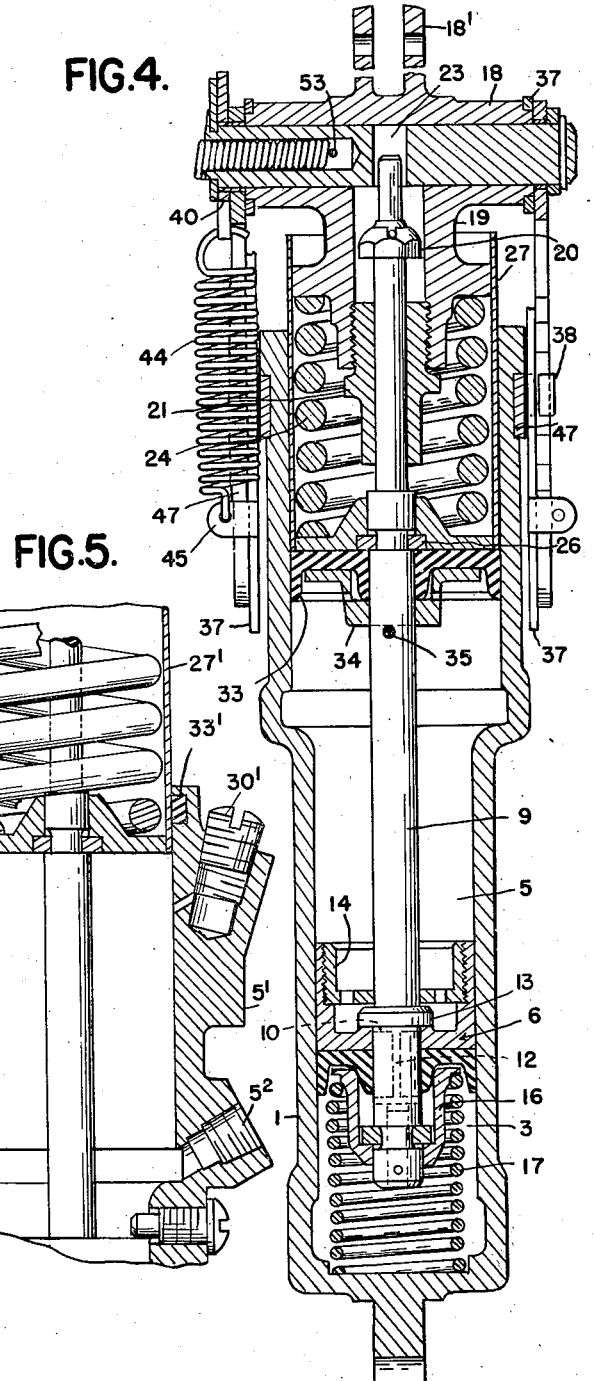
INVENTOR.
LUDWIG A. MAJNERI
BY
ATTORNEYS Patented Mar. 17, 1942

2,276,853

UNITED STATES PATENT OFFICE 2,276,853

FLUID PRESSURE CONTROL DEVICE

Ludwig A. Majneri, Grosse Pointe, Mich., assignor to The Warner Aircraft Corporation, Detroit, Mich., a corporation of Michigan Application December 23, 1940, Serial No. 371,415

12 Claims. (Cl. 60—54.6)

The invention relates to fluid pressure control devices and refers more particularly to fluid pressure control devices for hydraulic brakes.

The invention has for one object to provide an improved fluid pressure control device of the compression type.

The invention has for another object to provide a compression type of control device which can be operated to either positively or yieldably produce fluid pressure for actuating a part, such as a friction device of a brake.

The invention has for further objects to provide mechanism for controlling the operation of the control device to either positively or yieldably produce fluid pressure; to provide mechanism which can be readily brought into operation or released for holding the control device in applied position to yieldably produce fluid pressure; and to provide means for operating the two mechanisms jointly.

These and other objects of the invention will become apparent from the following description, taken in connection with the accompanying drawings, in which Figure 1 is a side elevation, partly in section, of a fluid control device embodying my invention;

Figure 2 is a cross section on the line 2—2 of Figure 1;

Figure 3 is a side elevation showing the fluid pressure control device in applied position to yieldably produce fluid pressure;

Figure 4 is a cross section on the line 4—4 of Figure 3;

Figure 5 is a view similar to Figure 1 showing a modification.

The fluid pressure control device is particularly applicable to a hydraulic braking system of an airplane and comprises the vertical cylinder member 1, the upper end fitting 2, and mechanism operated by the fitting for producing fluid pressure in the cylinder member.

The cylinder member has a closed lower end and an open upper end and is formed with the pressure cylinder 3 having the outlet 4 connecting into its lower end and the axially aligned reserve cylinder 5 above the pressure cylinder. The cylinder member is pivotally mounted at its lower end upon a suitable support and the fitting is pivotally connected at its upper end to suitable operating means, such as a pedal.

6 is the pressure piston within the pressure cylinder and having the upwardly facing cup-shaped body 7 and the downwardly facing sealing cup 8, the webs of which normally abut. 9 is the piston rod which extends axially through the body and sealing cup and is provided with the transverse upper and lower passages 10 and 11 and the axial passage 12 connecting the upper and lower passages. The piston rod is also provided with the integral collar 13 above the upper transverse passage 10 and having its lower face adapted to seat on the web of the cup-shaped body. 14 is an upwardly facing cup-shaped nut threaded into the cup-shaped body and having its web engageable with the upper face of the collar. The upward movement of the pressure piston is limited by means of the screws 15 threadedly engaging the cylinder member 1 and having their inner ends engageable with the upper end of the cup-shaped body. The web of the nut 14 is spaced from the web of the body a distance greater than the width of the collar 13 so that when the parts are in their normal or inoperative position the collar is spaced above the web of the body, the upper transverse passage 10 is located above the web of the body and the lower transverse passage 11 is located below the sealing cup. The web of the nut is provided with suitable apertures so that in the normal position of the parts communication is provided between the pressure cylinder and the reserve cylinder. However, it will be apparent that upon downward movement of the piston rod relative to the pressure piston the communication is closed. For the purpose of overcoming possible sticking of the sealing cup 8 with the wall of the pressure cylinder 3 during return of the pressure piston to its normal or inoperative position, there is the cup-shaped retainer 16 secured to the lower end of the piston rod 9 and having its upper end engageable with the web of the sealing cup. The upper end of the retainer is provided with milled radial grooves to secure continuous communication between the pressure and reserve cylinders when the parts are in their normal or inoperative position.

To return the pressure piston 6 and the piston rod 9 to their normal or inoperative positions, I provide the retracting coil spring 17 abutting the lower end of the pressure cylinder 3 and the flared portion at the upper end of the cup-shaped retainer 16. The spring acts through the retainer upon the piston rod which in turn acts upon the pressure piston through the collar 13 abutting the web of the nut 14. The screws 15 limit the return of the pressure piston and the nut 14 limits the return of the piston rod.

The end fitting 2 is formed with the transverse portion 18 having the upwardly extending spaced lugs 18' substantially midway of its ends for pivotal connection to the operating means. The end fitting is also formed with the central depending tubular portion 19 in axial alignment with the cylinder member 1. The upper end portion of the piston rod 9 extends into the tubular portion 19 and has threaded thereon the nut 20 for abutting the upper end of the retainer 21 threaded into the lower end of the tubular portion. 22 is a shaft extending through and rotatably adjustably mounted in the transverse portion 18 of the fitting for controlling the operation of the fluid pressure control device. The shaft is provided intermediate its ends with the transverse opening 23 which in one position of rotative adjustment of the shaft registers with and freely receives the free upper end of the piston rod 9 above the nut 20. However, in another position of rotative adjustment of the shaft a portion of its surface is engageable with the free upper end of the piston rod. In this latter position downward movement of the fitting compels downward movement of the piston rod which, after it seats on the pressure piston body, causes downward movement of the pressure piston to force the fluid under pressure through the outlet to the wheel cylinder of the associated brake.

24 is a coil spring in axial alignment with the pressure and reserve cylinders and having its upper end abutting the tubular portion 19 of the fitting and its lower end abutting the retainer 25 which is operatively connected to the piston rod 9 by means of the C-shaped retainer 26 extending into a groove formed in the piston rod. The assembly is such that the coil spring 24 is under compression at all times and serves when the pressure piston 6 and piston rod 9 are in normal or inoperative position to hold the end fitting 2 in normal or inoperative position. 27 is a cylindrical housing for the coil spring 24 fixedly secured at its lower end to the retainer 25 and sleeved over and slidably engaging the tubular portion 19 of the fitting and extending into and slidably engaging the wall of the reserve cylinder 5.

With this construction, it will be seen that when the shaft 22 is rotatably adjusted to register its opening 23 with the free upper end of the piston rod 9, the fitting 2 upon being moved downwardly forces the coil spring 24 downwardly, which in turn through the retainers 25 and 26 forces the piston rod 9 downwardly to thereby force the fluid under pressure in the pressure cylinder to the wheel cylinder of the associated brake. It will also be seen that the coil spring 24 can be further compressed when the pressure in the pressure cylinder overcomes the coil spring so that if the fitting is held in its down position the coil spring resiliently holds the fluid under pressure.

The reserve cylinder 5 is normally vented by the passage 28 in the wall of the reserve cylinder above the normal level of the reserve fluid in the reserve cylinder and the axial passage 29 in the plug 30 threaded into the boss 31 formed on the cylinder member 1. To prevent the escape of the fluid from the reserve cylinder through the vent passages when the fluid pressure control device is inverted or upside down, there is the ball 32 located in the boss and adapted to seat on the plug 30 to close communication between the passages 28 and 29.

To prevent the escape of fluid from the reserve cylinder past the spring housing when the fluid pressure control device is inverted or upside down, there is the sealing cup 33 which faces downwardly and is held against the retainer 25 by the retainer 34 which is held against the web of the sealing cup by suitable means such as the cotter pin 35 extending through the piston rod 9. In the normal or retracted position of the parts, the sealing cup 33 is located above the vent passage 28. To provide for venting the reserve cylinder when the sealing cup 33 is opposite or below the vent passage 28, the wall of the reserve cylinder is formed with the longitudinally extending groove 36 which communicates at its upper end with the vent passage 28. With this construction, venting is assured even when the fluid pressure control device is in applied position as long as it is in substantially vertical position and not inverted or upside down.

To guide the end fitting 2 during its upward and downward movement, I have provided the guide bars 37 at opposite sides of the fitting and sleeved at their upper ends over the transverse portion 18 of the fitting and having their lower ends slidably engaging the pawls 38 which are fixedly secured to opposite sides of the upper end of the cylinder member 1. As shown, the guide bars engage in notches in the pawls. To hold the guide bars from rotation relative to the end fitting, screws 39 extend through lateral extensions at the upper ends of the guide bars and threadedly engage the end fitting.

For rotatably adjusting the shaft 22 there is the lever 40 journaled on the shaft 22 and having the transverse lug 41 engageable with a radial lug 42 on the locator 43 which is fixed on an end of the shaft 22. The free end of the lever is connected to the upper end of the coil spring 44 having its lower end connected to the ear 45 of a guide bar 37. The free end of the lever is also connected to a cable which is adapted to be manually operated to swing the lever and thereby turn the shaft 22 until the radial lug 46 on the lever 40 engages the head of a screw 39, at which time the transverse opening 23 in the shaft 22 registers with and is adapted to freely receive the free upper end of the piston rod 9. At this time, downward movement of the end fitting produces fluid pressure through the coil spring 24.

47 are ratchet bars at opposite sides of the end fitting adjacent the guide bars 37 and journaled upon the end portions of the shaft 22 and connected by the cross bar 48 so that both ratchet bars are adapted to swing in unison. Each ratchet bar has the shoulder 49 adapted to engage a head of a screw 39. Each ratchet bar also has a shoulder 50 above its teeth and one of these shoulders is engageable with the transverse lug 51 upon the lever 40. The shoulder and lug are normally held in engagement by the torsion spring 52 which extends within the shaft 22 and has its inner end secured to the pin 53 extending through the shaft and its outer end secured to the ratchet bar. With this construction the spring 44 normally holds the lever 40 in a position as determined by the heads of the screws 39 engaging the shoulders 49 upon the ratchet bars.

A washer 22' and cotter pin 22² at the end of the shaft 22 opposite the locator 43 hold the shaft from accidental disengagement from the fitting.

When the parts are in their normal or inoperative position, as illustrated in Figures 1 and 2, the ratchet bars extend at an angle of substantially 10 degrees from the plane passing through the axis of the shaft 22 and the pawls 38 and the hole 23 in the shaft 22 is substantially at right angles to the piston rod 9 so that upon downward movement of the end fitting 2 fluid pressure is positively produced independently of the coil spring 24. However, upon pulling the cable connected to the free end of the lever 40 and swinging the lever in a counter-clockwise direction, as viewed in Figure 1, until the lug 46 of the lever engages the head of the associated screw 39, the shaft 22 is turned to register its opening 23 with the free end of the piston rod 9 so that upon downward movement of the end fitting fluid pressure is produced resiliently through the coil spring 24. This swinging of the lever through the torsion spring 52 causes the ratchet bars 47 to swing toward the pawls 38 to bring the teeth of the ratchet bars successively into engagement with the pawls during the downward movement of the end fitting. When the desired fluid pressure has been attained, corresponding teeth of the ratchet bars engage the pawls, either completely or partially. If the engagement is partial it becomes complete during the slight return movement of the end fitting when relieved of downward pressure and in either case the teeth firmly engage the pawls when downward pressure on the end fitting has ceased. At this time, the ratchet bars effectively hold the end fitting in down position. The lever 40 may then be allowed to swing in a clockwise direction, as viewed in Figure 1, by releasing the cable at which time the lug 51 of the lever engages the shoulder 50 of the associated ratchet bar. This return is accomplished by the spring 44 and is independent of the shaft 22 which cannot return to its normal position by reason of the upper free end of the piston rod engaging its opening 23. Figures 3 and 4 illustrate the parts of the control device held in applied position.

To relieve the fluid pressure in the pressure cylinder, the end fitting is released by being moved downwardly a slight distance sufficient to relieve the friction between the teeth of the ratchet bars and the pawls, at which time the spring 44 acting through the lug 51 of the lever 40 and the shoulder 50 of the associated ratchet bar causes this ratchet bar and also the other to swing free from the pawls and to engage their shoulders 49 with the heads of the screws 39. Then as the end fitting is being allowed to move upwardly, the free upper end of the piston rod 9 moves out of the opening 23 in the shaft 22, after which the shaft 22 is rotated by the torsion spring 52 to its normal position.

In the modification illustrated in Figure 5, the operation is the same as that of the fluid pressure control device illustrated in Figures 1 to 4, inclusive. However, the construction differs in that instead of using the sealing cup 33 for preventing the escape of fluid from the reserve cylinder past the packing spring housing when the fluid pressure control device is inverted, the sealing ring 33' between the wall of the reserve cylinder 5' and the housing 27' is employed. As shown, the sealing ring is located in an annular groove in the wall of the reserve cylinder. In this connection, it is apparent that if desired the sealing ring may also be used with the sealing cup 33 in the structure illustrated in Figures 1 to 4 inclusive.

The modification also differs by providing for a fluid reserve in addition to that of the reserve cylinder. As shown, the longitudinal groove 36 is omitted and a solid plug 30' is substituted for the plug 30 and ball 32. Also the level indicating screw below the boss 31 is omitted since the reserve level must be measured in the external tank which is connected to the reserve cylinder 5' through the opening 5² at its lower or inner end. During the filling operation, the plug 30' is loosened or removed to allow bleeding of the air. In this construction, the external reserve tank must be vented.

What I claim as my invention is:

1. In a fluid pressure control device, the combination with a pressure cylinder having an outlet, a pressure piston movable within said cylinder toward said outlet for forcing braking fluid through said outlet and a piston rod operatively connected to said piston, of a spring having its axis substantially parallel to said piston rod, said spring being operatively connected at its inner end nearest said piston to said piston rod, an end fitting operatively connected to the outer end farthest from said piston of said spring for compressing said spring and thereby moving said piston toward said outlet upon movement of said fitting toward said cylinder, and means separate from said spring for moving said piston toward said outlet upon movement of said fitting toward said cylinder comprising a member upon said fitting movable into operative relation to said piston rod.

2. In a fluid pressure control device, the combination with a cylinder member provided with a pressure cylinder and an outlet for said cylinder, a pressure piston movable within said cylinder toward said outlet for forcing braking fluid through said outlet and a piston rod operatively connected to said piston, of a spring having its axis substantially parallel to said piston rod, said spring being operatively connected at its inner end nearest said piston to said piston rod, an end fitting movable toward said cylinder and operatively connected to the outer end farthest from said piston of said spring for compressing said spring and thereby moving said piston toward said outlet, and means comprising a bar under tension between said cylinder member and fitting for holding said fitting in a position compressing said spring.

3. In a fluid pressure control device, the combination with a pressure cylinder having an outlet, a pressure piston movable within said cylinder toward said outlet for forcing braking fluid through said outlet and a piston rod operatively connected to said piston, of a coil spring having its axis substantially parallel to said piston rod, said spring being operatively connected at its inner end nearest said piston to said piston rod, an end fitting operatively connected to the outer end farthest from said piston of said spring for compressing said spring and thereby moving said piston toward said outlet upon movement of said fitting toward said cylinder, means separate from said spring for moving said piston toward said outlet upon movement of said fitting toward said cylinder comprising a member upon said fitting movable into operative relation to said piston rod, and means comprising a toothed member under tension for holding said fitting in a position compressing said spring.

4. In a fluid pressure control device, a pressure cylinder having an outlet, a reserve cylinder in substantial alignment with said pressure cylinder, a pressure piston within said pressure cylinder, a piston rod operatively connected to said piston and extending through said reserve cylinder, a spring in substantial alignment with said cylinders and located at the end of said reserve cylinder opposite said pressure cylinder, means for operatively connecting the inner end of said spring to said rod, a housing for said spring extending into said reserve cylinder, an end fitting movable toward said cylinders and operatively connected to the outer end of said spring for compressing the same, and means for preventing the escape of fluid from said reserve cylinder past said housing upon inversion of the device.

5. In a fluid pressure control device, a pressure cylinder having an outlet, a reserve cylinder in substantial alignment with said pressure cylinder, a pressure piston within said pressure cylinder, a piston rod operatively connected to said piston and extending through said reserve cylinder, a spring in substantial alignment with said cylinders and located at the end of said reserve cylinder opposite said pressure cylinder, an abutment for the inner end of said spring operatively connected to said rod, a sealing cup secured to said abutment and engaging the wall of said reserve cylinder for preventing the escape of fluid from said reserve cylinder past said abutment upon inversion of the device, and an end fitting movable toward said cylinders and abutting the outer end of said spring for compressing the same.

6. In a fluid pressure control device, a pressure cylinder having an outlet, a reserve cylinder in substantial alignment with said pressure cylinder, a pressure piston within said pressure cylinder, a piston rod operatively connected to said piston and extending through said reserve cylinder, a spring in substantial alignment with said cylinders and located at the end of said reserve cylinder opposite said pressure cylinder, an abutment for the inner end of said spring operatively connected to said rod, a housing for said spring extending into said reserve cylinder, a packing ring between said reserve cylinder and housing for preventing the escape of the fluid from said reserve cylinder past said housing upon inversion of the device, and an end fitting movable toward said cylinders and abutting the outer end of said spring for compressing the same.

7. In a fluid pressure control device, a pressure cylinder having an outlet, a reserve cylinder in substantial alignment with said pressure cylinder, a pressure piston within said pressure cylinder, a piston rod operatively connected to said piston and extending through said reserve cylinder, a spring in substantial alignment with said cylinders and located at the end of said reserve cylinder opposite said pressure cylinder, an abutment for the inner end of said spring operatively connected to said rod, an end fitting movable toward said cylinders and abutting the outer end of said spring for compressing the same, a cup-shaped sealing member engaging the wall of said reserve cylinder and secured to said abutment and in normal position preventing the escape of fluid from said reserve cylinder past said abutment upon inversion of the device, an air vent for said reserve cylinder opening thereinto below said sealing member when in its normal position, and a longitudinally extending groove in the wall of said reserve cylinder extending from said air vent toward said pressure cylinder.

8. In a fluid pressure control device, a pressure cylinder having an outlet, a pressure piston within said cylinder, a piston rod operatively connected to said piston, a spring operatively connected to said rod, a fitting operatively connected to said spring for moving said piston toward said outlet, and a rotatable shaft carried by said fitting and having a transverse recess for registering with and freely receiving the free end of said rod in one position of rotation of said shaft and also having a portion of its surface for abutting the free end of said rod in another position of rotation of said shaft.

9. In a fluid pressure control device, a cylinder member provided with a pressure cylinder and an outlet for said cylinder, a pawl on said cylinder member, a pressure piston within said cylinder, a piston rod operatively connected to said piston, a spring operatively connected to said rod, a fitting operatively connected to said spring for moving said piston toward said outlet through said spring, a rotatably adjustable shaft carried by said fitting and having a transverse recess for registering with and freely receiving the free end of said rod in one position of rotative adjustment of said shaft and also having a portion of its surface for abutting the free end of said rod in another position of rotative adjustment of said shaft, a lever operatively connected to said shaft to rotate the same to register its recess with the free end of said rod, a ratchet rotatably mounted on said shaft and engageable with said pawl, and means for yieldably urging said ratchet about said shaft and toward said pawl.

10. In a fluid pressure control device, a cylinder member provided with a pressure cylinder and an outlet for said cylinder, a pawl on said cylinder member, a pressure piston within said cylinder, a piston rod operatively connected to said piston, a spring operatively connected to said rod, a fitting operatively connected to said spring for moving said piston toward said outlet through said spring, a rotatably adjustable shaft carried by said fitting and having a transverse opening for registering with and freely receiving the free end of said rod in one position of rotative adjustment of said shaft, a locator fixed on said shaft, a lever rotatable on said shaft and engageable with said locator to turn said shaft upon swinging of said lever in one direction, cooperating means on said fitting and lever for limiting the swinging of said lever in said direction to register the transverse opening in said shaft with the upper end of said rod, a ratchet rotatable on said shaft and engageable with said pawl upon swinging of said lever in said direction, a spring for resiliently urging said lever in the opposite direction, a spring for urging said ratchet in a direction to engage said pawl, and cooperating means on said lever and ratchet for angularly positioning said parts relative to each other when under the influence of said springs.

11. In a fluid pressure control device, a cylinder member provided with a pressure cylinder and an outlet for said cylinder, a pawl on said cylinder member, a pressure piston within said cylinder, a piston rod operatively connected to said piston, a spring, an abutment for the inner end of said spring operatively connected to said rod, a fitting movable toward said cylinder and abutting the outer end of said spring, a rotatably adjustable shaft carried by said fitting and having a transverse opening for freely receiving the free end of said rod in one position of rotative adjustment of said shaft and also having a portion of its surface for abutting the free end of said rod in another position of rotative adjustment of said shaft, a guide for said fitting sleeved over said fitting and slidably engaging said pawl, a threaded member for securing said guide to said fitting, a locator fixed on said shaft, a lever journaled on said shaft and engageable with said locator in one direction of swinging of said lever to turn said shaft, said lever having a lug engageable with said threaded member to limit said swinging to register the transverse opening in said shaft with the upper end of said rod, a ratchet journaled on said shaft and engageable with said pawl, a spring between said shaft and ratchet for urging said ratchet toward said pawl, a spring between said guide and lever for urging said lever in the opposite direction, and cooperating means on said lever and ratchet for determining the relative angular positions of said lever and ratchet under the influence of said springs.

12. In a fluid pressure control device, a pressure cylinder having an outlet, a pressure piston within said cylinder, a piston rod operatively connected to said piston, a spring operatively connected to said rod, a fitting operatively connected to said spring for moving said piston toward said outlet, and adjustable means carried by said fitting provided with an abutment surface internally of said fitting clearing the free end of said rod in one position of said adjustable means and opposed to the free end of said rod for directly engaging the same upon movement of said fitting from its normal position in another position of said adjustable means.

LUDWIG A. MAJNERI.